3,408,265
RECOVERY OF STYRENE FROM ETHYL BENZENE BY A SINGLE COLUMN DISTILLATION WITH STYRENE VAPOR SIDE DRAW
Dennis J. Ward, Lombard, Ill., assignor to Universal Oil Products Company, Des Plaines, Ill., a corporation of Delaware
Filed Nov. 22, 1966, Ser. No. 596,154
5 Claims. (Cl. 203—2)

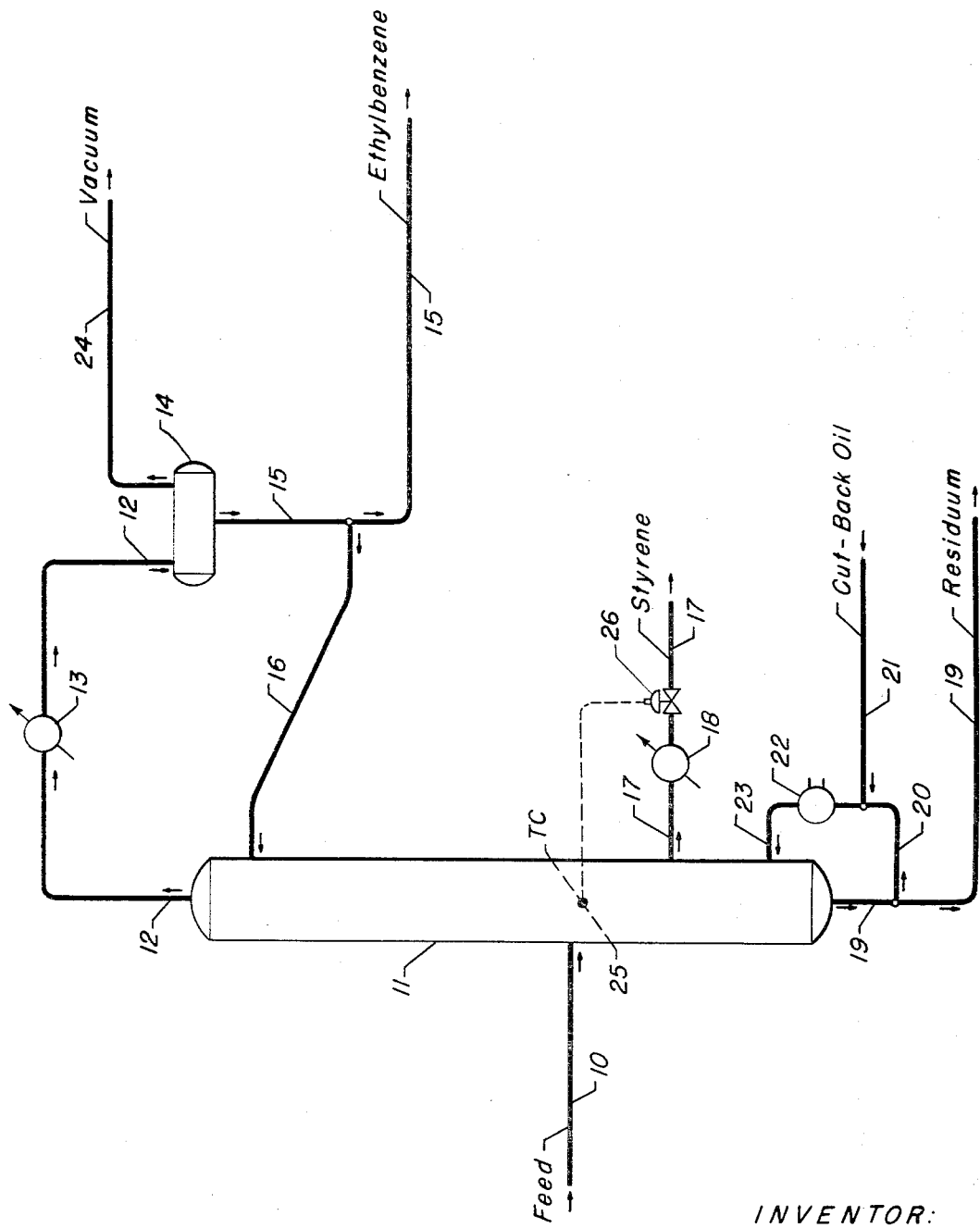

ABSTRACT OF THE DISCLOSURE

Method for distilling a mixture of ethylbenzene and styrene in a single distillation column having a column bottoms temperature exceeding 220° F. Styrene in a purity from 95% to 99% by weight is recovered from the column as a sidecut vapor fraction. Ethylbenzene in high purity is recovered as an overhead fraction. Cut-back oil is introduced into the bottom of the column to provide sufficient heat for distillation purposes and as a carrying medium for polymers and residuum which may be formed during the distillation of ethylbenzene from styrene.

---

This invention relates to a method for fractionation. It particularly relates to a method for separating the normally liquid components contained in the effluent of an ethylbenzene dehydrogenation reaction zone. It specifically relates to a method for separating high purity styrene from a feed mixture comprising ethylbenzene and styrene via an improved fractionation system.

It is well known in the art to subject ethylbenzene to a catalytic dehydrogenation reaction for the production of sytrene therefrom. Typically, the effluent from such a reaction zone contains benzene, toluene, unreacted ethylbenzene, styrene, high boiling polymers, and some tar. This material conventionally is subjected to fractional distillation through a series of fractionation towers in order to separate the various components into relatively pure product streams. The separation, however, is extremely difficult since it has been said that styrene is easily heat polymerizable. Accordingly, the prior art processes operate the distillation system at significant sub-atmospheric pressure in order to avoid subjecting the styrene to abnormally high temperatures thereby losing styrene through the polymerization reaction.

As an example of the prior art process, U.S. Patent No. 2,370,948, Mar. 6, 1945, to T. A. Gadwa, teaches a multiple distillation system for the purpose of producing high purity styrene from a styrene-containing mixture comprising benzene, toluene, ethylbenzene, styrene, isopropylbenzene, and other high boiling constituents. This feed mixture, according to the patentee, is subjected to an initial separation in a fractionation zone wherein benzene and toluene are taken overhead and a relatively high boiling material, containing ethylbenzene and styrene, is removed as a bottoms product. The overhead product is passed into additional fractionation columns whereby benzene and toluene are separated in substantially pure form. The bottoms mixture of styrene and ethylbenzene is subsequently introduced into a three-tower fractionation system whereby ethylbenzene is taken as an overhead product from the first series of towers and styrene in high concentration is removed as an overhead stream from the last fractionation column in the train.

It can be seen from the teachings of this patentee, that it is, in fact, extremely difficult to separate styrene from its close boiling associates contained in the effluent from an ethylbenzene dehydrogenation reaction zone. The patentee also clearly teaches that the styrene is heat polymerizable.

Another more recent illustration of the prior art process is contained in U.S. Patent No. 3,084,108, Apr. 2, 1963, to G. A. Randall. In this latter patent, the patentee discloses a distillation method for separating ethylbenzene and styrene in a single distillation column. However, as with Gadwa patent, Randall discloses that benzene and toluene must be removed by a separate fractionation system and that styrene must also be separated from the tarry residue material in a final styrene recovery column. Accordingly, the most recent prior art reference discloses that a complicated and multiple train fractionation system is necessary to separate the various components from the effluent of an ethylbenzene dehydrogenation reaction zone.

Accordingly, it is an object of this invention to provide an improved fractionation method.

It is another object of this invention to provide an improved distillation method for separating the normally liquid components contained in the effluent from an ethylbenzene dehydrogenation zone.

It is still another object of this invention to provide an improved distillation method for separating high purity styrene from a feed mixture comprising ethylbenzene and styrene.

According to the present invention, a method for separating high purity styrene from a feed mixture comprising ethylbenzene and styrene, comprises introducing said mixture into a distillation zone maintained under distillation conditions, withdrawing an overhead stream comprising ethylbenzene, withdrawing styrene as a side-cut vapor fraction, introducing relatively non-volatile hydrocarbons into said zone, removing residuum including said non-volatile hydrocarbons as a bottoms fraction, and condensing said side-cut vapor fraction to produce a product stream comprising high purity styrene.

Other embodiments of this invention include the withdrawing of the side-cut vapor fraction at a temperature from 190° F. to 270° F. and maintaining the columns bottom at a temperature from 220° F. to 290° F.

It is noted that the improvement discovered by this invention is the withdrawal of the styrene product stream from a single distillation column as a vapor stream. It is preferred, however, in operating the present invention to add the relatively non-volatile hydrocarbon as a cut-back oil into the bottom of the column in conjunction with a conventional reboiler system for the supplying of heat to the column. This cut-back oil may be any relatively non-volatile hydrocarbon oil, such as tetraethylbenzene, but should be of such character that it is easily pumpable at the temperatures and pressures associated with the bottom of the fractionation column. Additionally, as contemplated by this invention, the cut-back oil may, in fact, produce a small amount of vapor to provide a stripping medium to remove the last vestiges of the styrene from the residuum. However, the term "non-volatile" is intended to include a small amount of vaporization but does not include the use of a cut-back oil which would provide any significant quantity of extraneous vapor at the drawoff point for the styrene product.

In operating the distillation tower in accordance with the practice of this invention, the tower should contain relatively low pressure drop fractionation trays ranging from 50 to 120 total trays in the column. Each tray, preferably, should have no more than a 4 mm. Hg absolute pressure drop, and typically should be in the range of 2 to 3 mm. Hg in pressure drop. Conventional valve-type or sieve-type fractionation decks are satisfactory for the practice of this invention. Additionally, the design of the fractionation tower should be such as to minimize the residence time of the styrene in the distillation column. Normally, a residence time of from 2 minutes to 50 minutes will be satisfactory, although residence times below or above these specified limits may be acceptable in some cases. The degree to which the bottom of the column may exceed 220° F., of course, depends upon the limit of tolerable polymerization of the styrene which the operator has predetermined. Surprisingly, it was found that styrene does not undergo significant polymerization at elevated temperatures. Therefore, it is preferable to practice this invention with a column bottoms temperature exceeding 220° F.

To minimize the polymerization tendency of the styrene, it is also preferable to use relatively non-volatile styrene polymerization inhibitors, such as molten sulfur, during the distillation process. However, other types of inhibitors may be used and in these certain cases a small amount of oxygen may be needed in the tower to make these inhibitors effective. Otherwise, it is highly desirable to minimize the presence of oxygen gas during the distillation step.

During the discussion of the present invention, the overhead and bottoms temperature and pressure locations are deemed to be conventional. In other words, the overhead temperature and pressure are usually measured close to the distillation column in the vapor space above the top fractionation deck. In similar fashion, the bottoms temperature and pressure are normally measured at the liquid level maintained in the bottom of the column. However, other locations may be used with equally desirable results; for example, using a conventional reboiler system the temperature of the bottoms may be more conveniently measured on the returning vapor from the reboiler to the column. It should also be noted that the withdrawal rate of the styrene vapor product is preferably responsive to a temperature measurement within the column. Conveniently, this temperature measurement may be the temperature of the vapors being withdrawn. On the other hand, it has been found that a more consistently high quality material can be withdrawn from the column if this temperature is measured several fractionation decks above the drawoff level of the styrene vapor product.

It was found during the practice of this invention that extremely high purity styrene could be removed as a finished product from the single distillation column. Typically, the purity of the styrene product was in excess of 95% by weight and in some instances was as high as 99+% by weight styrene. Of equal importance is the fact that recoveries in the range of 95+% by weight styrene could be effectuated by the practice of this invention. Accordingly, one of the prime benefits for this invention is the complete elimination of the styrene rerun column and the capital and operating expenses associated therewith. Other benefits will be obvious to those skilled in the art.

The invention may be more fully understood with reference to the appended drawing which is a schematic representation of one embodiment of the invention.

Referring to the drawing, a feed mixture comprising ethylbenzene and styrene is passed into distillation column 11 via line 10. Preferably, this feed mixture has been preheated to a temperature from about 120° F. to about 300° F. Substantially pure ethylbenzene is withdrawn from the column via line 12 and passed into condensing means 13 to provide a liquid material comprising ethylbenzene in accumulator 14. Line 24 is suitably connected to a vacuum source so that the distillation column 11 is operated at a sub-atmospheric pressure ranging from 20 to 160 mm. Hg absolute. The ethylbenzene is removed as a product stream via line 15 and preferably is recycled to the ethylbenzene dehydrogenation reaction zone. A portion of the ethylbenzene accumulated in settler 14 is returned to fractionation column 11 via line 16 as reflux on the top of the column.

Styrene is withdrawn from fractionation column 11 via line 17 as a vapor product. The styrene vapor product is withdrawn at a rate responsive to a temperature within the column such as TC 25 which activates control valve 26 in line 17. It is important to note that it is essential in the practice of this invention that the styrene be so removed as a vapor product. This vapor stream is passed into condenser 18 for condensing the styrene which is removed from the process and passed into storage. If desirable, a styrene polymerization inhibitor, such as tertiary butylcatechol, may be added to the vapor styrene in line 17 to further inhibit any polymerization tendency of the styrene. The bottoms from the column is removed via line 19 and comprises high boiling aromatic materials, tars, and the relatively non-volatile styrene polymerization inhibitor, if any, such as the molten sulfur. A portion of the residuum is recycled through reboiler means 22, suitably heated by steam, via line 20. Preferably, a cut-back oil comprising, for example, tetraethylbenzene, is added to the material in line 20 via line 21 to provide suitable hot circulation of liquid in the bottom of the tower. The heated material is removed from reboiler 22 and returned to the column at a bottom portion thereof via line 23. This circulation of relatively heavy material in the bottom of the column serves the function of supplying heat to the column for distillation purposes, and provides a means for the continual withdrawal of tars and any polymers associated therewith, thereby minimizing the tendency of the bottom of the column to plug up through the deposition of solid or tarry deposits. It was found that operating the column in this fashion allowed for considerably longer on-stream periods than had been normally associated with the practices of the prior art. In addition, by careful controlling of the temperature in the bottom of the column, the amount and purity of the styrene could easily be controlled. If the temperature in the bottom was allowed to drop below 220° F., it was found that an undue amount of styrene was lost from the system. On the other hand, the presence of the cut-back oil and the certain minimum amount of vapors associated therewith completely remove the styrene from the residuum product thereby maximizing the recovery of styrene.

In the practice of this invention, distillation tower 11 may contain from 50 to 120 distillation trays. In addition, the operating conditions associated therein will include an overhead temperature from 120° F. to 190° F., an overhead pressure from 20 to 160 mm. Hg absolute, and a bottoms temperature exceeding 220° F. generally within the range from 220° F. to 280° F. The styrene product is withdrawn at a rate responsive to a temperature from 190° F. to 270° F. Those skilled in the art from the teachings presented herein will know how to optimize the operating conditions in distillation tower 11 for the maximum production of high purity styrene.

The invention claimed:
1. Method for separating high purity styrene from a feed mixture comprising ethylbenzene and styrene which comprises introducing said feed mixture into a distillation zone maintained under distillation conditions, withdrawing an overhead stream comprising ethylbenzene, withdrawing styrene as a side-cut vapor fraction, introducing relatively non-volatile hydrocarbons into said zone, removing residuum including said non-volatile hydrocarbons as a bottoms fraction, and condensing said side-cut vapor fraction to produce a product stream comprising high purity styrene.

2. Method according to claim 1 wherein said side-cut vapor fraction is withdrawn at a rate responsive to a temperature within said zone from 190° F. to 270° F. and said bottoms temperature is from 220° F. to 280° F.

3. Method according to claim 1 wherein said non-volatile hydrocarbon comprises relatively heavy aromatic hydrocarbons.

4. Method according to claim 3 wherein said non-volatile hydrocarbon comprises tetraethylbenzene.

5. Method for separating a mixture comprising ethylbenzene and styrene in a single distillation column which comprises withdrawing styrene from the column as a side-cut vapor fraction at a rate responsive to a temperature within the column from 190° F. to 270° F.; withdrawing ethylbenzene as an overhead distillate fraction at a column overhead temperature from 120° F. to 190° F., a column overhead pressure from 20 mm. Hg absolute to 160 mm. Hg absolute; and, maintaining a columns bottom temperature from 220° F. to 280° F.

References Cited

UNITED STATES PATENTS

| | | | |
|---|---|---|---|
| 2,398,689 | 4/1946 | Bloomer | 260—669 |
| 2,411,106 | 11/1946 | Petry et al. | 260—669 |
| 2,556,030 | 6/1951 | Coulter | 203—69 |
| 2,871,169 | 1/1959 | Martin. | |
| 3,209,044 | 9/1965 | Meek et al. | 260—669 |
| 3,331,753 | 7/1967 | Foester et al. | 203—2 |

WILBUR L. BASCOMB, JR., *Primary Examiner.*